US009412391B2

(12) United States Patent
Ono et al.

(10) Patent No.: US 9,412,391 B2

(45) Date of Patent: Aug. 9, 2016

(54) SIGNAL PROCESSING DEVICE, SIGNAL PROCESSING METHOD, AND COMPUTER PROGRAM PRODUCT

(71) Applicant: KABUSHIKI KAISHA TOSHIBA, Tokyo (JP)

(72) Inventors: Toshiyuki Ono, Kawasaki (JP); Makoto Hirohata, Kawasaki (JP); Masashi Nishiyama, Kawasaki (JP); Toru Taniguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 300 days.

(21) Appl. No.: 14/135,806

(22) Filed: Dec. 20, 2013

(65) Prior Publication Data

US 2014/0180685 A1 Jun. 26, 2014

(30) Foreign Application Priority Data

Dec. 20, 2012 (JP) ................................ 2012-277999
Nov. 13, 2013 (JP) ................................ 2013-235396

(51) Int. Cl.

*G10L 15/20* (2006.01)
*G10L 21/0272* (2013.01)
*G10H 1/36* (2006.01)

(52) U.S. Cl.

CPC ............ *G10L 21/0272* (2013.01); *G10H 1/361* (2013.01); *G10H 2210/021* (2013.01); *G10H 2210/046* (2013.01); *G10H 2210/056* (2013.01)

(58) Field of Classification Search

CPC . G10L 21/0208; G10L 21/0216; G10L 25/78; G10L 2021/02165; G10L 2021/02168; G10L 21/02; G10L 25/84; G10L 2021/02163; G10L 21/028; G10L 15/24; G10L 19/028; G10L 2021/02082; G10L 2021/02166; G10L 21/0264; G10L 19/025; G10L 21/04; G10L 19/008; G10L 2021/065

USPC ......... 704/231, 233, 235, 217, 225, 270, 208, 704/210, 214, 215; 379/406.01

See application file for complete search history.

(56) References Cited

U.S. PATENT DOCUMENTS

| | | | | |
|---|---|---|---|---|
| 6,163,608 | A * | 12/2000 | Romesburg | H04M 9/082 379/406.01 |
| 6,522,751 | B1 | 2/2003 | Iwase et al. | |
| 7,139,701 | B2 * | 11/2006 | Harton | 704/217 |
| 2013/0035933 | A1 | 2/2013 | Hirohata | |

FOREIGN PATENT DOCUMENTS

| | | |
|---|---|---|
| JP | 3381062 | 12/2002 |
| JP | 3670562 | 4/2005 |

OTHER PUBLICATIONS

U.S. Appl. No. 14/058,829, filed Oct. 21, 2013 entilted "Signal Processing Device, Signal Processing Method, and Computer Program Product".

* cited by examiner

*Primary Examiner* — Huyen Vo

(74) *Attorney, Agent, or Firm* — Nixon & Vanderhye, P.C.

(57) ABSTRACT

According to an embodiment, a signal processing device includes a background calculator, a signal generator, an extractor, a similarity calculator, and a mixer. The background calculator is configured to calculate a first background signal in which a speech signal is removed, based on the acoustic signals. The signal generator is configured to generate a reference signal from at least one of the acoustic signals. The extractor is configured to extract a second background signal by removing a speech signal from the reference signal. The similarity calculator is configured to calculate a similarity between feature data of the background signals. The mixer is configured to calculate a weighted sum of the background signals in such a way that a greater weight is given to the first background signal as the similarity is higher and a greater weight is given to the second background signal as the similarity is lower.

18 Claims, 18 Drawing Sheets

FIG.16

| CONDITION / SIGNAL | CONDITION 1 | CONDITION 2 | CONDITION 3 | CONDITION 4 |
|---|---|---|---|---|
| | FIRST SIMILARITY: HIGH | FIRST SIMILARITY: LOW | FIRST SIMILARITY: HIGH | FIRST SIMILARITY: LOW |
| | IMPORTANCE ON BACKGROUND SOUND | IMPORTANCE ON BACKGROUND SOUND | IMPORTANCE ON SPEECH | IMPORTANCE ON SPEECH |
| THIRD BACKGROUND SOUND SIGNAL | LARGE | SMALL | SMALL | SMALL |
| SECOND BACKGROUND SOUND SIGNAL | SMALL | LARGE | SMALL | SMALL |
| SPEECH SIGNAL | SMALL | SMALL | LARGE | LARGE |

SIGNAL PROCESSING DEVICE, SIGNAL PROCESSING METHOD, AND COMPUTER PROGRAM PRODUCT

CROSS-REFERENCE TO RELATED APPLICATION

This application is based upon and claims the benefit of priority from Japanese Patent Application No. 2012-277999, filed on Dec. 20, 2012 and Japanese Patent Application No. 2013-235396, filed on Nov. 13, 2013; the entire contents of which are incorporated herein by reference.

FIELD

Embodiments described herein relate generally to a signal processing device, a signal processing method, and a computer program product.

BACKGROUND

A technology for removing a speech signal (human voice or the like) from an acoustic signal may be used to make background sound that is lost in speech and that is hard to make out easily audible, or to play a piece of music karaoke style by removing the voice of the singer from music content. For example, a technology for removing a speech signal from acoustic signals of two channels, a right signal and a left signal, is known.

Now, there are various relationships between signals regarding acoustic signals of two channels. When the signals of two channels are given as a left signal L and a right signal R, respectively, these are modeled in the following manner.

$$L=B_L+C_L+e_L$$

$$R=B_R+C_R+e_R$$

Now, $B_L$ and $B_R$ are background sound signals included in the left signal and the right signal, respectively. Also, $C_L$ and $C_R$ are speech signals included in the left signal and the right signal, respectively. Moreover, $e_L$ and $e_R$ are noises included in the left signal and the right signal, respectively. The noise includes a microphone noise, and an encoding noise. Many contents are created such that the speech signals are equally included in the left signal and the right signal. Thus, as conditions regarding the left signal and the right signal, there are four conditions as follows depending on the combinations of whether the background sounds are equal and whether the noises are equal.

Condition 1: $B_L \neq B_R$, $e_L = e_R$

Condition 2: $B_L \neq B_R$, $e_L \neq e_R$

Condition 3: $B_L = B_R$, $e_L = e_R$

Condition 4: $B_L = B_R$, $e_L \neq e_R$

Conditions 1 and 2 are cases where the background sounds are different for the left signal and the right signal. For example, a stereo signal corresponds to Conditions 1 and 2. Conditions 3 and 4 are cases where the background sounds are equal between the left signal and the right signal. For example, a case where a monaural signal is input as a two-channel signal corresponds to Conditions 3 and 4.

Acoustic signals of TV broadcasting correspond, in many cases, to Condition 1. Acoustic signals recorded in some DVDs correspond to Condition 3. Other acoustic signals such as the acoustic signals of videos on the Internet include signals of various conditions, and it is not possible to grasp in advance to which condition an acoustic signal corresponds. Also, according to Condition 3, the left signal and the right signal perfectly match each other, and thus, recognition is easy. However, because of the influence of noises, it is generally difficult to distinguish Condition 4 from Conditions 1 and 2 based on input acoustic signals.

As described above, acoustic signals include signals of various conditions. However, the conventional technology of removing a speech signal from acoustic signals of two channels is effective only for the acoustic signals of Conditions 1 and 2, and is not capable of appropriately removing speech from the acoustic signals of Conditions 3 and 4. For example, speech cannot be removed from a monaural signal.

BRIEF DESCRIPTION OF THE DRAWINGS

FIG. 16 is a table illustrating relationships of weights of signals at a mixer;

DETAILED DESCRIPTION

According to an embodiment, a signal processing device includes an acquirer, a first background sound calculator, a first signal generator, an extractor, a similarity calculator, and a mixer. The acquirer is configured to acquire a first acoustic signal and a second acoustic signal. The first background sound calculator is configured to calculate a first background sound signal in which a speech signal is removed, based on the first acoustic signal and the second acoustic signal. The first signal generator is configured to generate a first reference signal from at least one of the first acoustic signal and the second acoustic signal. The extractor is configured to extract a second background sound signal by removing a speech signal from the first reference signal. The similarity calculator is configured to calculate a first similarity indicating a degree of similarity between feature data of the first background sound signal and feature data of the second background sound signal. The mixer is configured to calculate a weighted sum of the first background sound signal and the second background sound signal in such a way that a greater weight is given to the first background sound signal as the first similarity is higher and a greater weight is given to the second background sound signal as the first similarity is lower.

Hereinafter, preferred embodiments of a signal processing device according the invention will be described in detail with reference to the drawings.

First Embodiment

A signal processing device according to a first embodiment first calculates a background sound signal (for example, a difference signal) obtained by removing a speech signal from acoustic signals of two channels. Next, a reference signal in which the speech signal is removed is generated from the acoustic signals. Then, the similarity between the background sound signal and the reference signal is calculated, and a weighted sum of the background sound signal and the reference signal is calculated according to the weight according to the similarity. A background sound signal obtained by removing a speech signal from the acoustic signals is thereby generated also under a condition where the same background sound signal is included in the acoustic signals of two channels.

Figure 1:
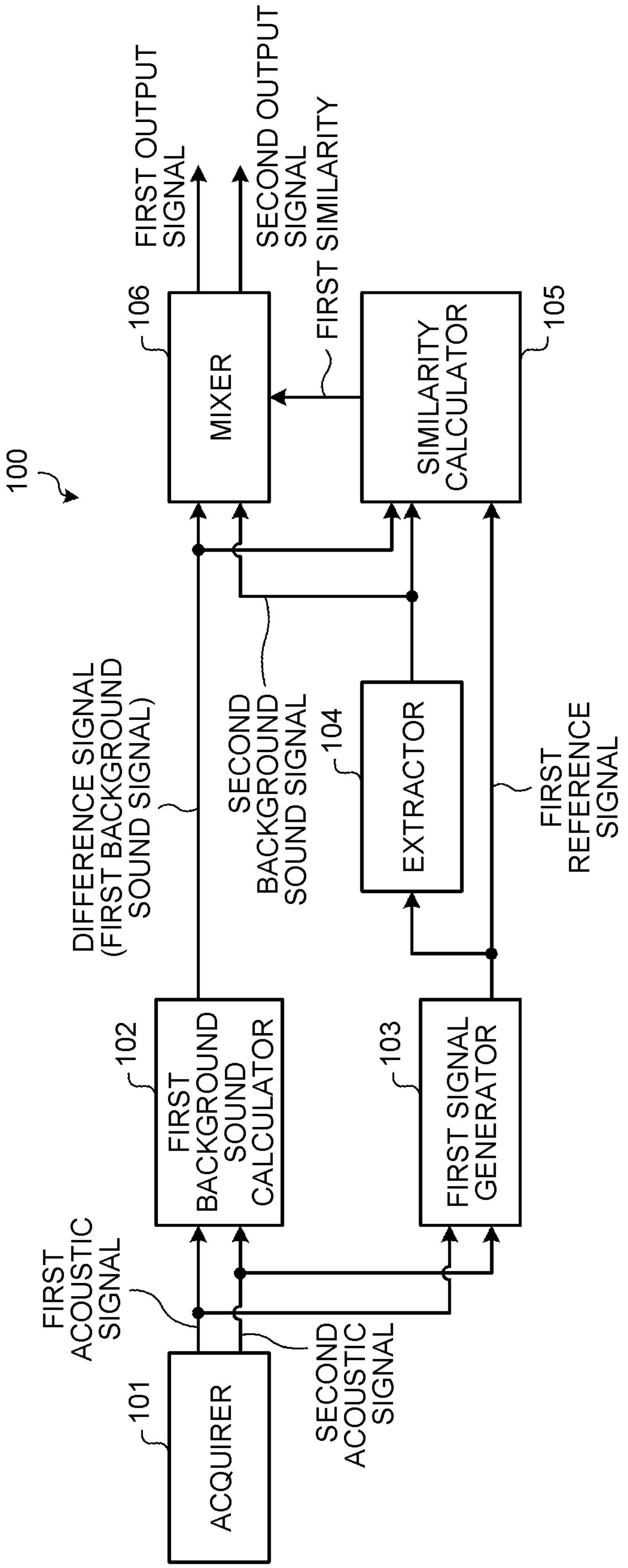
FIG. 1 is a block diagram of a signal processing device of a first embodiment.

FIG. 1 is a block diagram illustrating an example configuration of a signal processing device 100 of the first embodiment. The signal processing device 100 includes an acquirer 101, a first background sound calculator 102, a first signal generator 103, an extractor 104, a similarity calculator 105, and a mixer 106.

The acquirer 101, the first background sound calculator 102, the first signal generator 103, the extractor 104, the similarity calculator 105, and the mixer 106 may be realized by a processing device such as a CPU (Central Processing Unit) executing programs, that is, by software, or may be realized by hardware such as an IC (Integrated Circuit), or may be realized by a combination of software and hardware.

The acquirer 101 acquires acoustic signals of two channels, a first acoustic signal and a second acoustic signal.

The first background sound calculator 102 calculates a first background sound signal in which the speech signal is removed, from the first acoustic signal and the second acoustic signal. For example, the first background sound calculator 102 calculates a difference signal which is the difference between the first acoustic signal and the second acoustic signal as the first background sound signal. In the following, a case where the difference signal is used as the first background sound signal will be described as an example. Additionally, the calculation method of the first background sound signal is not restricted to the above, and any method that is conventionally used may be applied as long as the method allows calculation of the background sound signal with the first acoustic signal and the second acoustic signal as stereo signals. For example, it is possible to apply a method of calculating a similarity between left and right signals for each of frequency bands which have been divided, and suppressing a signal in a frequency band to a greater degree as the similarity is higher, to thereby calculate a background sound signal in which a signal localized at the center including speech is suppressed.

The first signal generator 103 generates a first reference signal from at least one of the first acoustic signal and the second acoustic signal. The extractor 104 extracts a second background sound signal by removing the speech signal from the first reference signal. The similarity calculator 105 calculates a first similarity indicating the degree of similarity between the difference signal and the second background sound signal. The mixer 106 calculates a weighted sum of the difference signal and the second background sound signal according to a weight determined by the first similarity.

Figure 2:
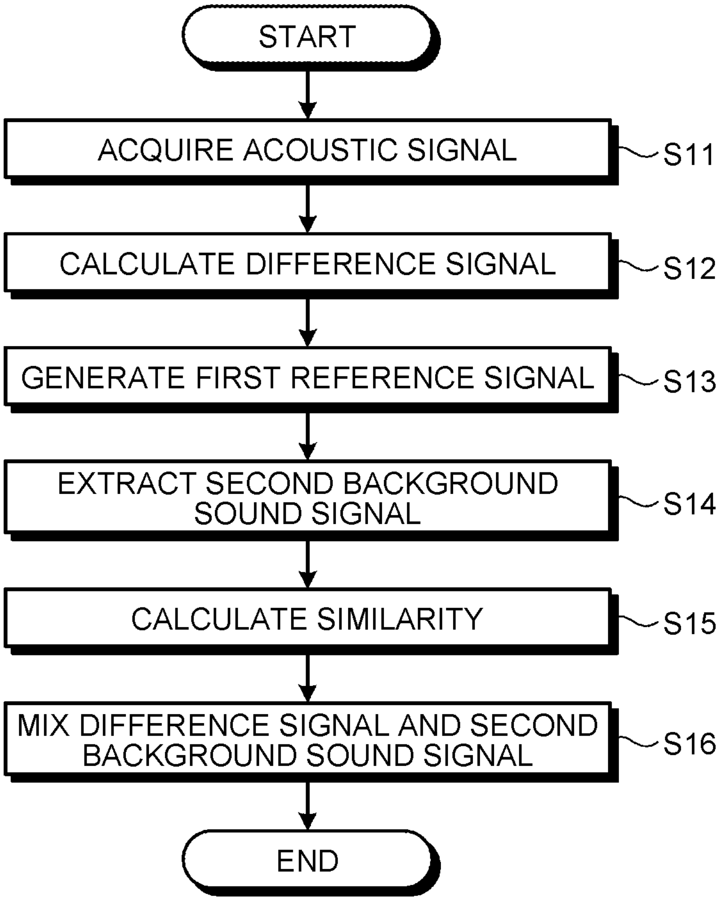
FIG. 2 is a flow chart illustrating an operation of the signal processing device of the first embodiment.

Next, an operation of the signal processing device 100 will be described with reference to FIGS. 1 and 2. FIG. 2 is a flow chart illustrating an example operation of the signal processing device 100 of the first embodiment.

First, the acquirer 101 acquires a first acoustic signal and a second acoustic signal (step S11). The acquirer 101 may acquire a first acoustic signal and a second acoustic signal which are acoustic signals of two channels, or may extract (acquire) a first acoustic signal and a second acoustic signal from video data including acoustic signals. Furthermore, the acquirer 101 may acquire a first acoustic signal and a second acoustic signal by selecting signals of two channels from acoustic signals of a larger number of channels, such as acoustic signals of 5.1 channels, for example, or by downmixing acoustic signals of a large number of channels by a predetermined factor. In the present embodiment, the first acoustic signal is the left signal of acoustic signals of two channels, and the second acoustic signal is the right signal.

Next, the first background sound calculator 102 calculates a difference signal which is the difference between the first acoustic signal and the second acoustic signal (step S12). The difference signal is calculated by the following Equation (1) with the first acoustic signal as L and the second acoustic signal as R.

$$S=(L-R)/2 \tag{1}$$

Then, the first signal generator 103 generates a first reference signal by one of the first acoustic signal, the second acoustic signal, and a weighted sum of the first acoustic signal and the second acoustic signal (step S13). In the following, the weighted sum of the first acoustic signal and the second acoustic signal is taken as the first reference signal. The first reference signal is calculated by the following Equation (2), for example. Additionally, the weight is not restricted to the example (½) of Equation (2).

$$M=(L+R)/2 \tag{2}$$

Next, the extractor 104 extracts a second background sound signal by removing the speech signal from the first reference signal (step S14). For example, the extractor 104 extracts a second background sound signal from the first reference signal by sound source separation using nonnegative matrix factorization (NMF). An example of an extraction method that uses the nonnegative matrix factorization will be described below.

First, the extractor 104 Fourier-transforms a first reference signal from time t to time t+N−1, and obtains an amplitude spectrum and a phase spectrum of the first reference signal. Here, N is the number of samples that are the targets of Fourier transform, and is 2048, for example. Then, the extractor 104 reads a set of bases for representing the amplitude spectrum of the speech signal, and a set of bases for representing the amplitude spectrum of the background sound signal. These bases may be learned and prepared in advance by using the speech signal and the background sound signal. For example, the extractor 104 uses twenty bases. A matrix representation of the set of bases for representing the amplitude spectrum of the speech signal is given as $E_v$. Also, a matrix representation of the set of bases for representing the amplitude spectrum of the background sound signal is given as $E_B$. Then, the extractor 104 factorizes, using the nonnegative matrix factorization, the amplitude spectrum of the first reference signal into the format of a factor and the bases which have been read, and obtains the value of the factor. This calculation is calculation of w that minimizes the value of the following Equation (3) where a vector indicating the amplitude spectrum of the first reference signal is given as p, a vector of a factor to be obtained is given as w, and a matrix in which $E_v$ and $E_B$ are arrayed is given as E (=[$E_v$ $E_B$]).

$$\|p-Ew\|^2 \tag{3}$$

Specifically, the extractor 104 performs calculation of the following Equation (4).

$$w_k^{(n+1)} = w_k^{(n)} \frac{\sum_i p_i E_{i,k}}{\sum_i \left(\sum_k E_{i,k} w_k^{(n)}\right) E_{i,k}} \tag{4}$$

Here, "$\bullet_x$" indicates an x-th component of the vector, and "$\bullet_{x,y}$" indicates a component at row x and column y of the matrix. Also, $w_k^{(n)}$ is the value at the n-th repetition of calculation of $w_k$. The extractor 104 repeatedly performs calculation of Equation (3) until the variation in the value of $w_k$ is at a predetermined value or less due to the repetition, or the repetition is performed a predetermined number of times. Additionally, as an initial value of repetition of $w_k^{(n)}$, any value other than zero may be used. For example, a random number other than zero is used as the initial value.

Moreover, a factor regarding $E_v$ is given as $w_v$, and a factor regarding $E_B$ is given as $w_B$. That is, the relationship of the following Equation (5) is established.

$$w = \begin{pmatrix} w_V \\ w_B \end{pmatrix} \tag{5}$$

Next, the extractor 104 calculates the amplitude spectrum of the second background sound signal by using the factors obtained. The amplitude spectrum of the second background sound signal is calculated based on $E_B w_B$. The extractor 104 may calculate the amplitude spectrum of the speech signal and subtract the amplitude spectrum of the speech signal from the amplitude of the first reference signal to thereby calculate the amplitude spectrum of the second background sound signal. That is, the extractor 104 may calculate the amplitude spectrum of the second background sound signal by $p-E_v w_v$.

Lastly, the extractor 104 obtains the second background sound signal by performing inverse-Fourier transform using the calculated amplitude spectrum of the second background sound signal and the phase spectrum of the first reference signal.

Additionally, the extraction method of the second background sound signal is not restricted to the method described above. It is also possible to extract the second background sound signal from the first reference signal by using a band-pass filter that attenuates the speech.

When the processing for time t to time t+N−1 is over, extraction of the second background sound signal is repeatedly performed while changing the processing target time.

Figure 3:
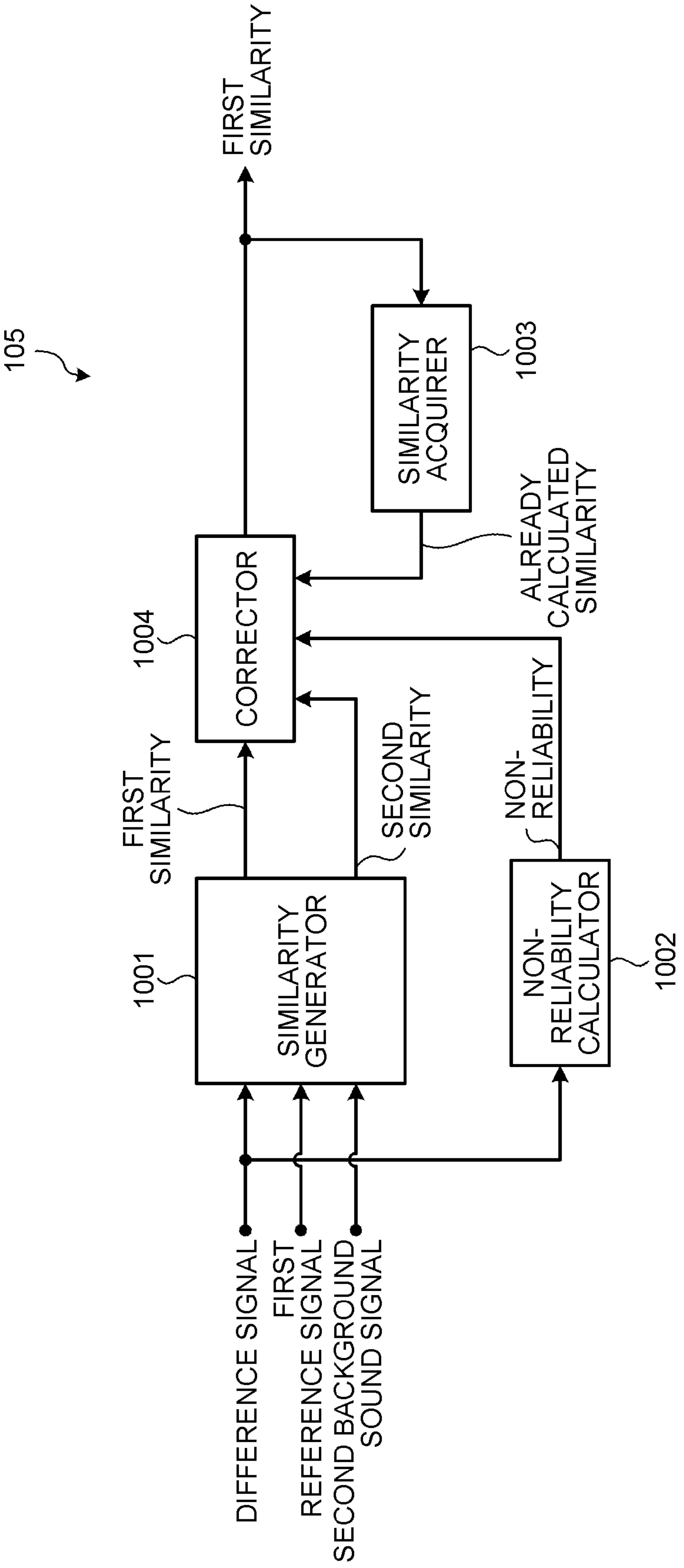
FIG. 3 is a diagram illustrating an example configuration of a similarity calculator.
Figure 4:
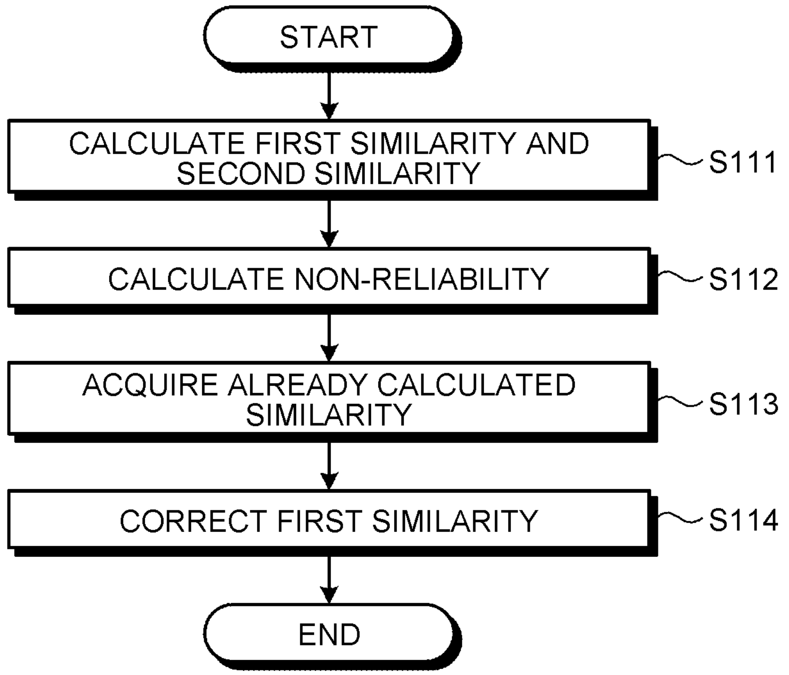
FIG. 4 is a flow chart illustrating an example operation of the similarity calculator.

Next, the similarity calculator 105 calculates a first similarity which is the degree of similarity between feature data of the difference signal and feature data of the second background sound signal (step S15). An operation of the similarity calculator 105 will be described with reference to FIGS. 3 and 4. FIG. 3 is a block diagram illustrating an example configuration of the similarity calculator 105. FIG. 4 is a flow chart illustrating an example operation of the similarity calculator 105.

As illustrated in FIG. 3, the similarity calculator 105 includes a similarity generator 1001, a non-reliability calculator 1002, a similarity acquirer 1003, and a corrector 1004. The similarity generator 1001 generates a first similarity which is the degree of similarity between the difference signal and the second background sound signal, and a second similarity which is the degree of similarity between the difference signal and the first reference signal. The non-reliability calculator 1002 calculates a non-reliability indicating the degree of likelihood of the difference signal being a noise. The similarity acquirer 1003 acquires an already calculated similarity which is the first similarity already calculated at a previous time. The corrector 1004 corrects the first similarity according to at least one of the second similarity and the non-reliability.

As illustrated in FIG. 4, first, the similarity generator 1001 calculates (generates) the first similarity which is the degree of similarity between the feature data of the difference signal and the feature data of the second background sound signal, and the second similarity which is the degree of similarity between the feature data of the difference signal and the feature data of the first reference signal (step S111).

Figure 5:
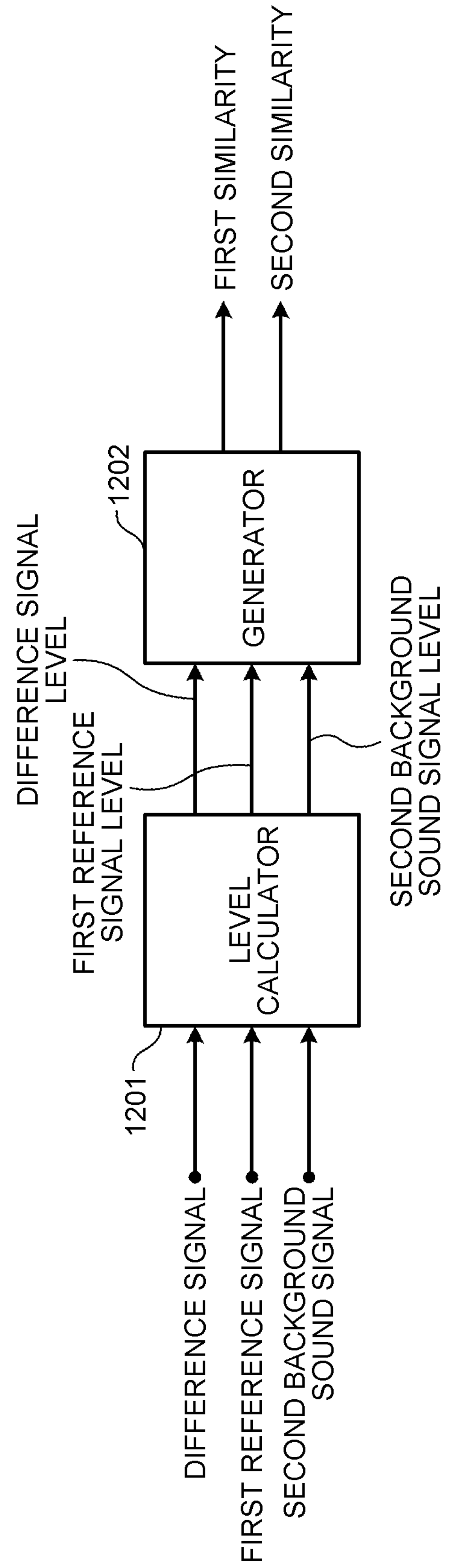
FIG. 5 is a block diagram illustrating an example configuration of a similarity generator.

FIG. 5 is a block diagram illustrating an example configuration of the similarity generator 1001. As illustrated in FIG. 5, the similarity generator 1001 includes a level calculator 1201, and a generator 1202. The level calculator 1201 calculates the amplitudes (levels) of signals within a unit time as pieces of feature data of the difference signal, the first reference signal, and the second background sound signal. The generator 1202 generates the first similarity and the second similarity by using the level of each signal.

Figure 6:
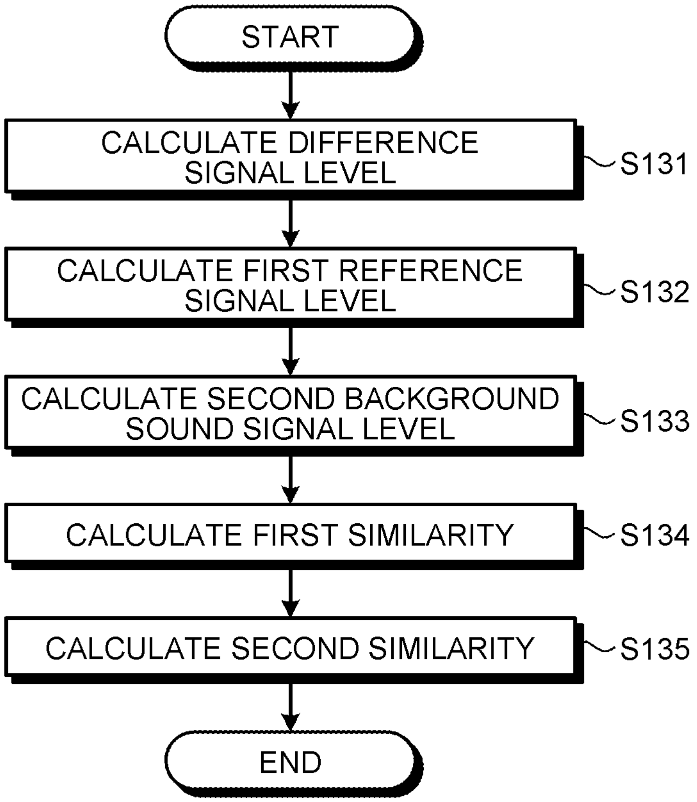
FIG. 6 is a flow chart illustrating an example operation of the similarity generator.

FIG. 6 is a flow chart illustrating an example operation of the similarity generator 1001. First, the level calculator 1201 calculates a difference signal level which is the amplitude of a signal within a unit time for the difference signal (step S131). When the unit time is given as N, an average value of a square of a signal value of the difference signal from time t to time t+N−1, or an average value of the absolute value of the signal value may be used as the difference signal level from time t to time t+N−1, for example. Also, an average value of a square of a factor obtained by Fourier-transforming the difference signal, and an average value of the absolute value of the factor may be used as the difference signal level.

Next, the level calculator 1201 calculates a first reference signal level which is the amplitude of a signal within a unit time for the first reference signal in the same manner as in S131 (step S132). Then, the level calculator 1201 calculates a second background sound signal level which is the amplitude of a signal within the unit time for the second background sound signal in the same manner as in S131 (step S133).

Next, the generator 1202 calculates the first similarity from the difference signal level and the second background sound signal level (step S134). For example, the first similarity takes a value between zero and one. The generator 1202 first calculates a ratio Rate between the difference signal level Lev(S) and the second background sound signal level Lev(A) by the following Equation (6).

$$\text{Rate}=\text{Lev}(S)/\text{Lev}(A) \tag{6}$$

Then, the generator 1202 calculates the first similarity by using the Rate. The generator 1202 simply calculates the first similarity such that the value is greater as the value of the Rate is closer to 1. The generator 1202 calculates a first similarity Sim by the following Equation (7), for example. Here, β is a parameter of a positive number, and 0.5 is used, for example.

$$Sim = e^{-\left(\frac{Rate-1}{\beta}\right)^2} \tag{7}$$

In the case the value of the Rate is smaller than a predetermined standard, the difference signal may be assumed to be a noise. On the other hand, in the case the value of the Rate exceeds one, it may be assumed that the difference signal level has become higher than the second background sound signal level because the second background sound signal has become smaller than the actual background sound due to the influence of insufficient extraction accuracy for the second background sound signal or the like. Accordingly, the value of the first similarity may be made one when the Rate exceeds one. That is, the first similarity is calculated by the following Equation (8).

$$Sim = \begin{cases} e^{-\left(\frac{Rate-1}{\beta}\right)^2} & \text{if Rate} < 1 \\ 1 & \text{otherwise} \end{cases} \tag{8}$$

Here, a case of using the amplitude of a signal as the feature data of the difference signal and of the second background sound signal is described. The first similarity may also be calculated by using a combination of pieces of feature data other than the amplitude of a signal and a calculation method of a distance Z between the pieces of feature data. For example, the generator 1202 may directly use signal values as the pieces of feature data, calculate the distance between the signal values of respective signals as Z, and calculate the first similarity based on the distance Z. For example, the generator 1202 calculates Z by the following Equation (9), and calculates Sim by the following Equation (10) using Z which has been calculated.

$$Z = \sum_i (S(i) - A(i))^2 \tag{9}$$

$$Sim = e^{-\left(\frac{Z}{\beta}\right)^2} \tag{10}$$

Here, A is the second background sound signal, "•(i)" is a signal value at time i, and Σ is a sum for the time i within a unit time. Also, the generator 1202 may calculate Sim based on the similarity regarding the pattern of the signal values. For example, the generator 1202 calculates the correlation between S and A, takes its inverse number as Z, and calculates Sim. Also, Sim may be calculated using, instead of the signal values, the similarity regarding the pattern of factors obtained by Fourier-transforming the signal values. For example, the generator 1202 may calculate the correlation between a plurality of factors obtained by Fourier-transforming the difference signal and the second background sound signal, and take its inverse number as Z. Also, the generator 1202 may calculate the correlation between the amplitude spectrum of the difference signal and the amplitude spectrum of the second background sound signal, and take its inverse number as Z.

According to the method described above, the pieces of feature data are scalar values, and the first similarity is calculated based on the similarity thereof. Vectors including two or more scalar values indicating the features of signals may be taken as the feature data, and the first similarity may be calculated based on the similarity thereof. For example, the generator 1202 may take vectors having two scalar values of Equations (6) and (9) as the feature data, and calculate the first similarity based on the weighted sum of Equations (8) and (10).

Next, the second similarity is calculated in the same manner as in step S134 by using the difference signal level and the first reference signal level (step S135). The second similarity is given as Sim2.

We will return to FIG. 4. Now, the non-reliability calculator 1002 calculates the non-reliability (step S112). The non-reliability calculator 1002 calculates the non-reliability in such a way that the non-reliability is lower as the average value of the absolute value of the signal value of the difference signal within a unit time is smaller, for example. This is because, in the case the average value of the absolute value of the signal value of the difference value within a unit time is small, the difference signal is assumed to be a noise. For example, the non-reliability calculator 1002 sets a certain threshold, and the non-reliability is one if the average value is greater than the threshold, and the non-reliability is zero if the average value is smaller than the threshold. Also, the non-reliability calculator 1002 may analyze the amplitude spectrum obtained by Fourier-transforming the difference signal, and may calculate low non-reliability in the case the amplitude spectrum is approximately the same in all the bands. This is because, also in this case, the difference signal is assumed to be a noise. This non-reliability is expressed as Bel.

Next, the similarity acquirer 1003 acquires the already calculated similarity which is the first similarity that is already calculated by the operation at a previous time (step S113). The already calculated similarity may be substituted by prior information obtained by using metadata such as metadata assigned to an acoustic signal in advance or metadata included in video content. For example, if information that video content is for stereo broadcasting is assigned, operation is possible with the already calculated similarity being one.

Next, the corrector 1004 corrects the first similarity based on the second similarity and the non-reliability (step S114). When the second similarity and the non-reliability are low, this is a case where the difference signal is assumed likely to be a noise, and the difference signal is assumed unlikely to be similar to the second background sound signal. On the other hand, when the second similarity and the non-reliability are high, the difference signal is not a noise, and thus, the difference signal is assumed likely to be similar to the second background sound signal. Thus, the first similarity is corrected based on the levels of the second similarity and the non-reliability. For example, the corrector 1004 gives parameters for adjusting the amounts of correction by the second similarity and the non-reliability as a and b, and corrects and replaces the first similarity by the value of the following Equation (11).

$$\text{Sim}+a(\text{Sim2}-0.5)+b(Bel-0.5) \tag{11}$$

Additionally, the corrector 1004 may correct the first similarity by at least one of the second similarity and the non-reliability. In this case, for example, one of a and b is made zero, and the first similarity is calculated by Equation (11). Also, the corrector 1004 may replace the first similarity by the weighted sum of the first similarity, the second similarity and the non-reliability given by the following Expression (12). Here, $d_1$, $d_2$ and $d_3$ are weight coefficients whose total sum is one.

$$d_1 \mathrm{Sim}+d_2 \mathrm{Sim2}+d_3 Bel \quad (12)$$

Furthermore, the parameters (a, b) for adjusting the amount of correction, and the weight coefficients ($d_1$, $d_2$, $d_3$) may be controlled by the already calculated similarity. In the case the already calculated similarity is low (that is, the proportion of noise in the difference signal is high), and the noise is in proportion to the amplitude of the first reference signal, the amount of correction by the second similarity is preferably made greater. That is, a and $d_2$ are made greater as the already calculated similarity is lower, and a and $d_2$ are made smaller as the already calculated similarity is higher.

The first similarity of time t to time t+N−1 may be calculated by the method described above. The similarity calculator 105 calculates the first similarity for each time while shifting the time by s. For example, after performing calculation for time t to time t+N−1, the similarity calculator 105 calculates the first similarity for time t+s to time t+N−1+s (where s<N).

Since s is smaller than N, the ranges of time where the first similarity is calculated overlap each other. With respect to such overlapping ranges of time, the similarity calculator 105 may calculate the average value of the already calculated first similarity and the currently calculated first similarity as the first similarity of the time.

Furthermore, the first similarity may be smoothed in the time direction. That is, for example, the similarity calculator 105 calculates the first similarity of time t+s to time t+N−1+s by alpha-blending the same with the first similarity of time t to time t+N−1. The temporal variation in the first similarity is thereby smoothed, and an effect of preventing occurrence of a noise in a first output signal and a second output signal output in the present embodiment, or of suppressing shaky sound is achieved.

Figure 7:
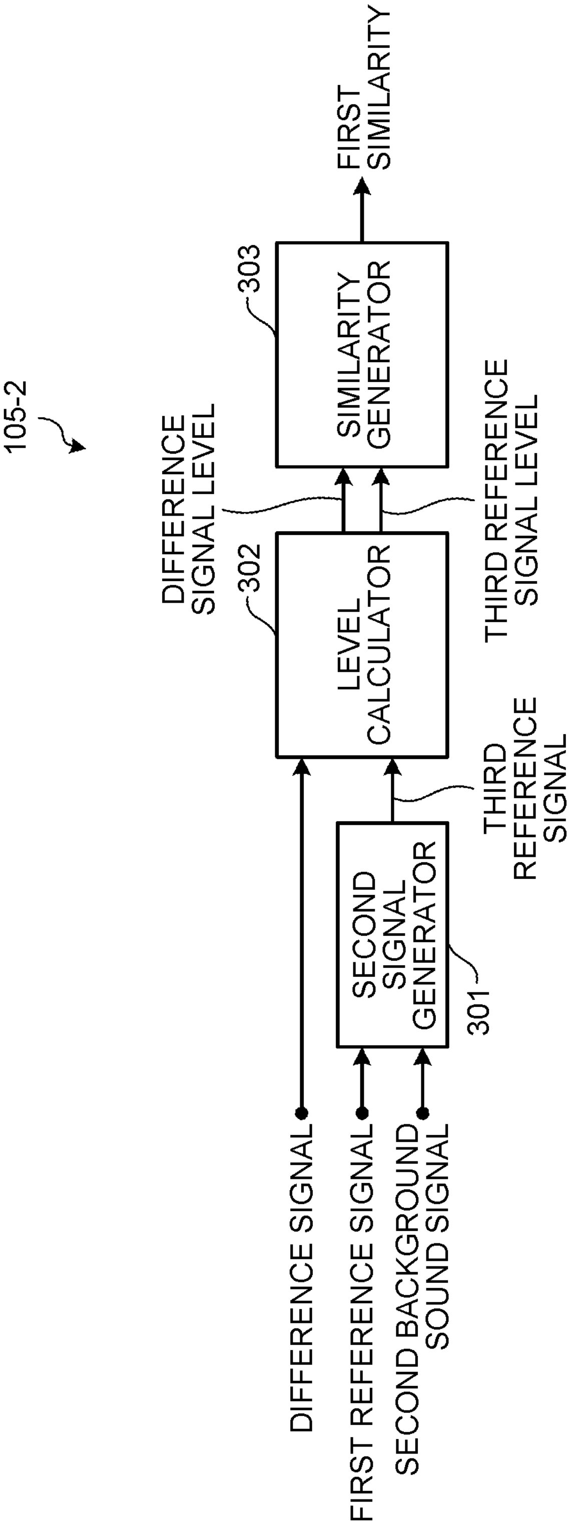
FIG. 7 is a diagram illustrating an example configuration of a similarity calculator.
Figure 8:
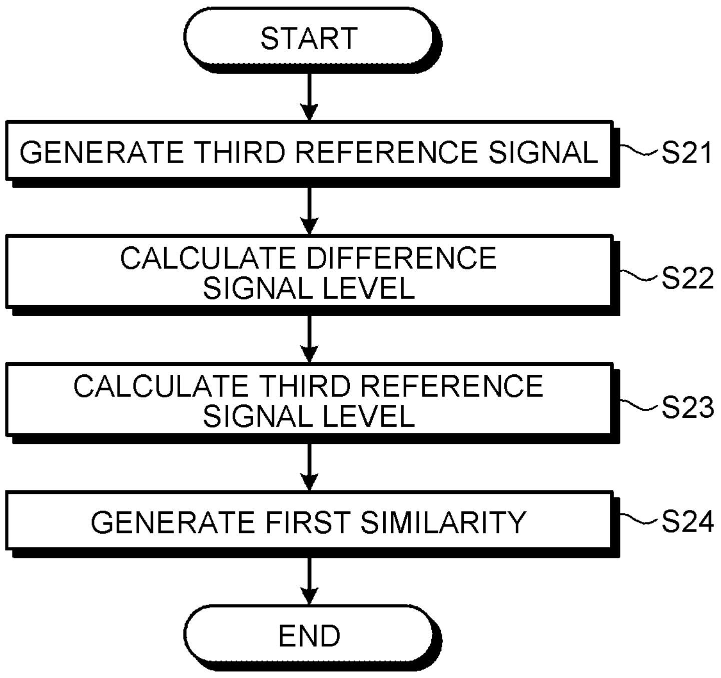
FIG. 8 is a flow chart illustrating an example operation of the similarity calculator.

An example modification (a similarity calculator 105-2) of the similarity calculator will be described with reference to FIGS. 7 and 8. FIG. 7 is a block diagram illustrating an example configuration of the similarity calculator 105-2. FIG. 8 is a flow chart illustrating an example operation of the similarity calculator 105-2. As illustrated in FIG. 7, the similarity calculator 105-2 includes a second signal generator 301, a level calculator 302, and a similarity generator 303.

The second signal generator 301 generates a third reference signal from the first reference signal and the second background sound signal. The level calculator 302 calculates a difference signal level and a third reference signal level as pieces of feature data of the difference signal and the third reference signal. The similarity generator 303 generates the first similarity from the difference signal level and the third reference signal level.

The flow chart of FIG. 8 will be described. First, the second signal generator 301 generates a third reference signal by the weighted sum of the first reference signal and the second background sound signal, for example (step S21). The third reference signal may be the first reference signal or the second background sound signal. Also, an arbitrary value determined in advance may be used as the weight for the weighted sum.

Figure 9:
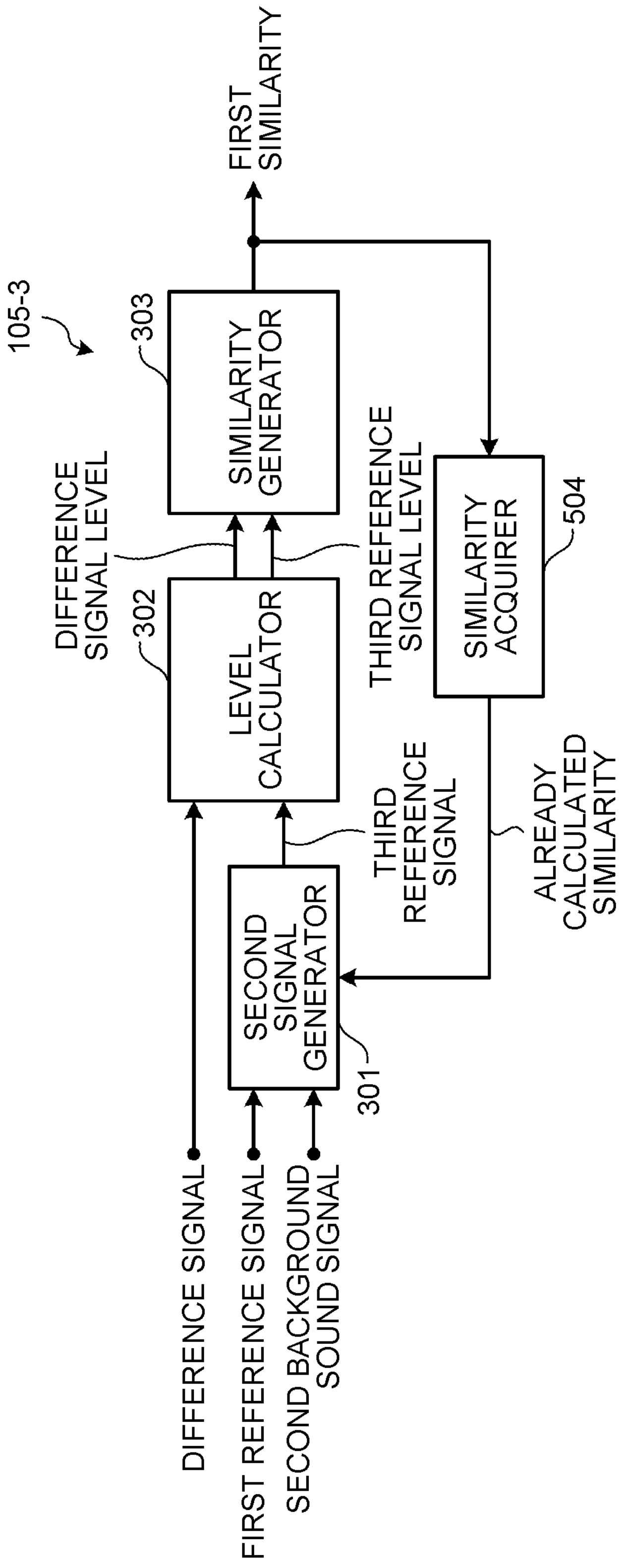
FIG. 9 is a diagram illustrating an example configuration of a similarity calculator.

Also, the weight may be controlled by the already calculated similarity which is the first similarity already calculated at previous time. FIG. 9 is a block diagram illustrating an example configuration of a similarity calculator 105-3 in the case of such control. The similarity calculator 105-3 includes a similarity acquirer 504 in addition to the configuration of FIG. 7. The similarity acquirer 504 acquires an already calculated similarity already calculated at previous time.

It is desirable that, when the already calculated similarity is high, the weight to be given to the second background sound signal is increased, and when the already calculated similarity is low, the weight to be given to the first reference signal is increased. When the already calculated similarity is low, the proportion of noise in the difference signal is expected to be high. Accordingly, the likelihood of a difference signal being a noise may be determined by comparing the feature data of the first reference signal and the feature data of the difference signal, and the calculation accuracy for the first similarity may be expected to be improved.

We will return to FIG. 8. Next, the level calculator 302 calculates, as the feature data of the difference signal and of the third reference signal, a difference signal level which is the amplitude of the difference signal within a unit time, and a third reference signal level which is the amplitude of the third reference signal within a unit time, in the same manner as in S131 (steps S22 and S23).

Next, the similarity generator 303 calculates the first similarity from the difference signal level and the third reference signal level in the same manner as in step S134 (step S24).

Additionally, also in the case of determining the first similarity from the difference signal and the third reference signal, the calculation method of the pieces of feature data and the first similarity is not restricted to the method described above. The patterns of signal values, factors obtained by Fourier-transforming the signal values, and the scalar values or vector values formed from the patterns of the factors may be used as pieces of feature data, and the first similarity may be calculated by the similarity of the pieces of feature data.

We will return to FIG. 2. Next, the mixer 106 calculates a first output signal and a second output signal by calculating the weighted sum of the difference signal and the second background sound signal according to the first similarity (step S16). The first output signal is the left signal output from the signal processing device 100 of the present embodiment, and the second output signal is the right signal output from the signal processing device 100 of the present embodiment. When the weight to be given to the difference signal is given as α, the first output signal $L_{OUT}$ and the second output signal $R_{OUT}$ are calculated by the following Equations (13) and (14), respectively. Here, B is the second background sound signal.

$$L_{OUT}=\alpha S+(1-\alpha)B \quad (13)$$

$$R_{OUT}=\alpha S+(1-\alpha)B \quad (14)$$

The weight α to be given to the difference signal is controlled to be greater as the first similarity is higher. For example, the value of the first similarity may be used as α as it is. That is, α is generated by the following Equation (15).

$$\alpha=\mathrm{Sim} \quad (15)$$

The following Equation (16) may be used for calculation such that α is greater when the first similarity is closer to one. Here, γ is a parameter of a positive number. Also, the values of α corresponding to Sim may be held in a table.

$$\alpha = e^{-\left(\frac{Sim-1}{\gamma}\right)^2} \quad (16)$$

The range of values of α is desirably between zero and one. Also, the upper limit value of α corresponding to Sim may be set to one or less. For example, α may take a value between zero and 0.5 according to the value of Sim.

Additionally, besides the calculation methods of the first output signal and the second output signal expressed by Equations (13) and (14), a difference signal of reversed phase may be added to one of the first output signal and the second output signal. That is, the first output signal and the second output signal may be calculated by the following Equations (17) and (18). An effect of increased stereo feeling of sound may thereby be achieved.

$$L_{OUT}=\alpha S+(1-\alpha)B \quad (17)$$

$$R_{OUT}=\alpha(-S)+(1-\alpha)B \quad (18)$$

The mixer 106 outputs the first output signal and the second output signal to an external device, a storage device or the like. That mixer 106 may output both the first output signal and the second output signal, or may output one of the first output signal and the second output signal.

In this manner, according to the signal processing device of the first embodiment, a weighted sum of a difference signal and a second background sound signal is calculated according to the similarity between the feature data of the difference signal and the feature data of the second background sound signal. Then, the background sound may be appropriately output with respect to various input signals.

Additionally, the speech signal is human voice, for example, but is not restricted thereto, and it may be any signal as long as it may be separated from a background sound signal. For example, in the case of applying nonnegative matrix factorization or the like, an arbitrary signal may be separated as the speech signal by appropriately changing the speech signal and the background sound signal to be used in learning.

Second Embodiment

Figure 10:
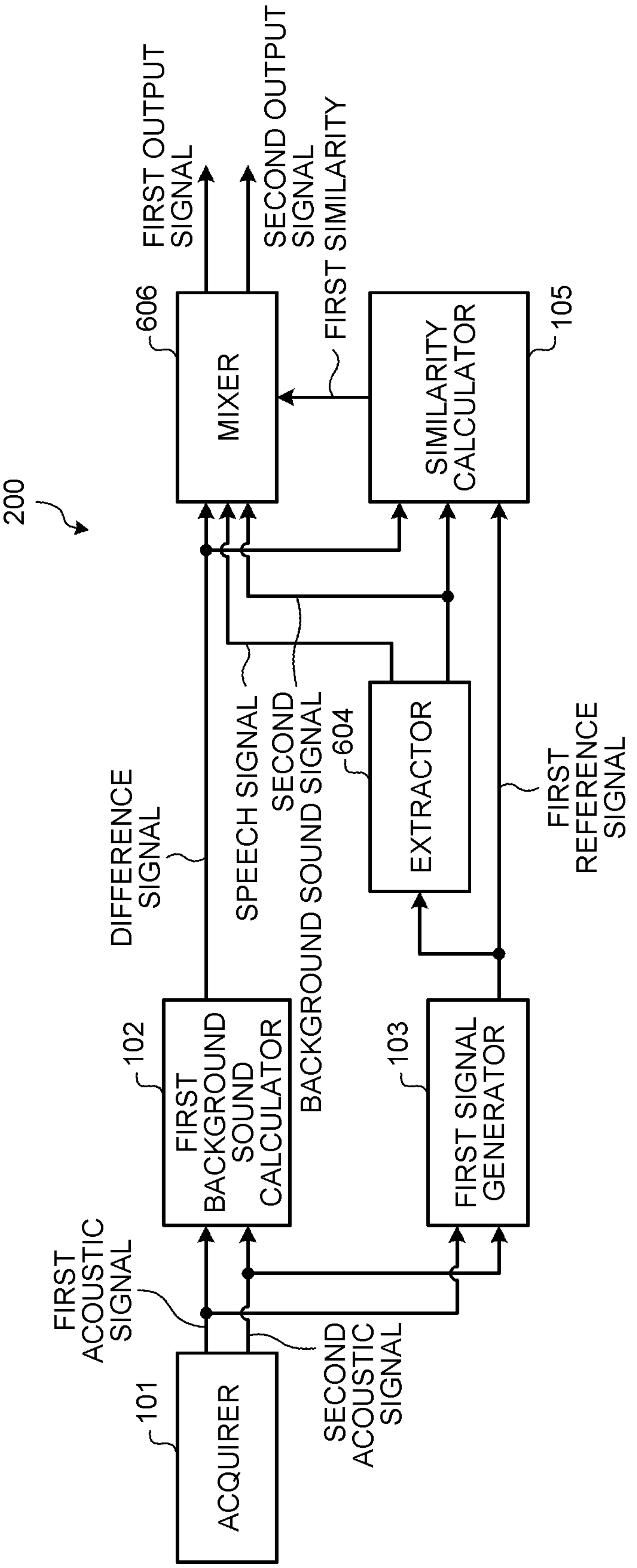
FIG. 10 is a block diagram illustrating a signal processing device of a second embodiment.

FIG. 10 is a block diagram illustrating an example configuration of a signal processing device 200 of a second embodiment. The signal processing device 200 of the second embodiment includes an acquirer 101, a first background sound calculator 102, a first signal generator 103, an extractor 604, a similarity calculator 105, and a mixer 606.

The functions of the extractor 604 and the mixer 606 of the second embodiment are different from those according to the first embodiment. Other configurations and functions are the same as those in FIG. 1, the block diagram of the signal processing device 100 according to the first embodiment, and are denoted with the same reference numerals, and redundant description thereof will be omitted.

The extractor 604 extracts, from a first reference signal, a second background sound signal in which the speech signal is removed and the speech signal. The mixer 606 calculates a weighted sum of a difference signal, the second background sound signal and the speech signal according to a weight determined based on a first similarity.

Next, an operation of the signal processing device 200 of the second embodiment will be described with reference to FIGS. 10 and 11. Additionally, FIG. 11 is a flow chart illustrating an example operation of the signal processing device 200 of the second embodiment.

Figure 11:
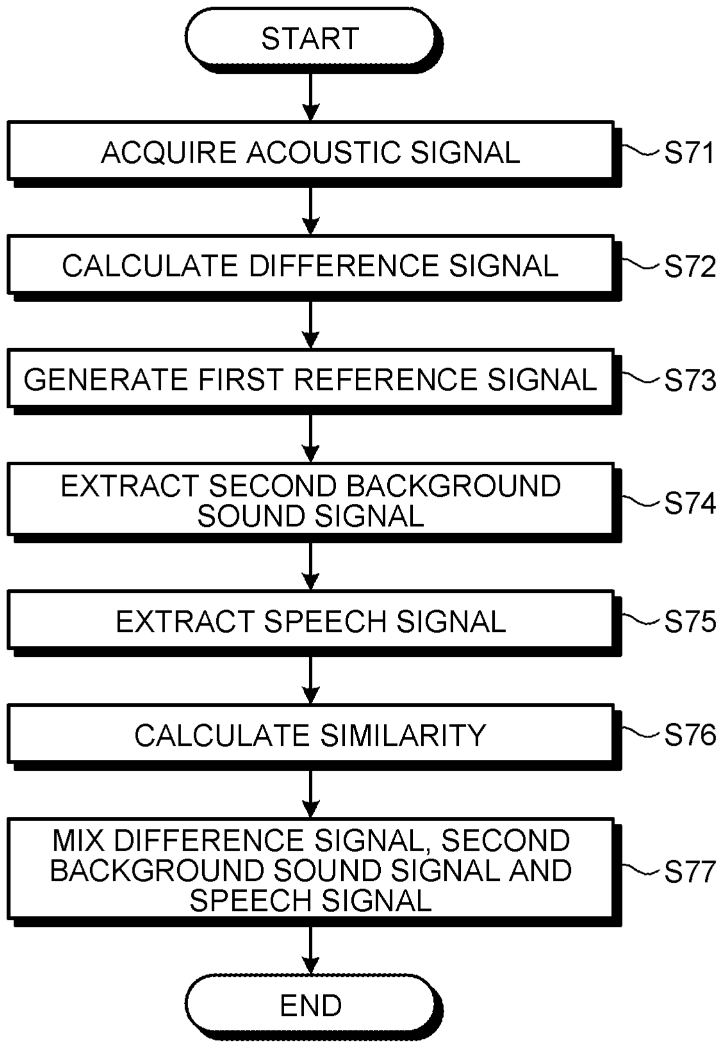
FIG. 11 is a flow chart illustrating an operation of the signal processing device of the second embodiment.

FIG. 11 is different from FIG. 2 illustrating an example operation of the signal processing device 100 of the first embodiment in that step S75 is added and also with respect to the process of step S77. Steps S71 to S74, and S76 are the same as steps S11 to S14, and S15 of FIG. 2, and redundant description thereof will be omitted.

In step S75, the extractor 604 extracts the speech signal from the first reference signal (step S75). The speech signal is obtained by subtracting the second background sound signal from the first reference signal. The extractor 604 may also calculate the speech signal by calculating $E_v w_v$ in the same manner as in step S14.

In step S77, the mixer 606 calculates a weighted sum of the difference signal, the second background sound signal and the speech signal, and generates the first output signal and the second output signal (step S77). First, the mixer 606 calculates a factor $\alpha$ for determining the ratio of weights of the difference signal and the second background sound signal based on the first similarity by the method described in step S16. Next, the mixer 606 acquires a factor $\lambda$ for determining the amplitude of the background sound signal, and a factor $\mu$ for determining the amplitude of the speech signal. The values of $\lambda$ and $\mu$ are zero or more, and may be determined in advance in such a way as to achieve a predetermined effect. For example, to make the speech signal easily audible, the value of $\mu$ is set to be greater than the value of $\lambda$. Also, in order to enable one to enjoy the ambience of a venue in a sports show or the like, the value of $\mu$ is made smaller than the value of $\lambda$ such that the voice of the commentator is reduced and the background sound is increased.

Also, the values of $\lambda$ and $\mu$ may be acquired by providing a factor acquirer for receiving a set value specified by a user, for example. Moreover, the values of $\lambda$ and $\mu$ may be directly specified, or may be specified according to the ratio and the average levels of $\lambda$ and $\mu$.

The mixer 606 calculates the first output signal and the second output signal by the following Equations (19) and (20). Here, the speech signal is given as V.

$$L_{OUT}=\lambda(\alpha S+(1-\alpha)B)+\mu V \quad (19)$$

$$R_{OUT}=\lambda(\alpha S+(1-\alpha)B)+\mu V \quad (20)$$

Figure 12:
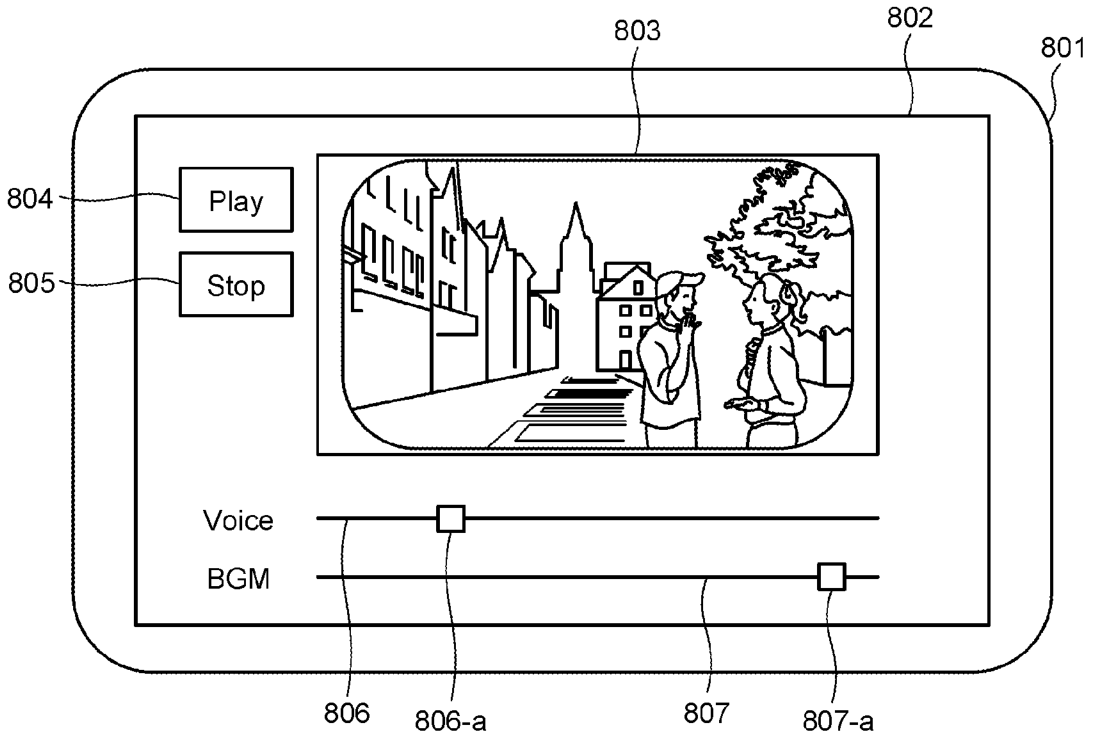
FIG. 12 is a schematic diagram illustrating an example application of the second embodiment.

FIG. 12 is a schematic diagram illustrating an example application of the second embodiment. FIG. 12 illustrates an example of an information terminal 801 such as a tablet. The information terminal 801 includes a display 802 formed of liquid crystal, for example. The display 802 receives touch input from a user. An image display window 803, a play button 804, a stop button 805, a display bar 806, and a display bar 807 are displayed on the display 802, for example.

The image display window 803 is a window for displaying an image of a video. The play button 804 is a button for starting playback of a video. The stop button 805 is a button for stopping playback of a video. The display bar 806 is a display bar for displaying the mixing ratio of the speech signal. The display bar 807 is a display bar for displaying the mixing rate of the background sound signal.

The display bar 806 includes a specification button 806-*a* for displaying the currently specified mixing ratio of the speech signal. The display bar 807 includes a specification button 807-*a* for displaying the currently specified mixing ratio of the background sound signal.

A user may specify the mixing ratio of the speech signal by touching the specification button 806-*a* and sliding the same in the lateral direction along the display bar 806. Likewise, a user may specify the mixing ratio of the background sound signal by the specification button 807-*a*. The mixing ratio of the speech signal and the mixing ratio of the background sound signal correspond to $\mu$ and $\lambda$ in step S77, respectively. Thus, a user may set the factor $\lambda$ and the factor $\mu$ to be used by the mixer 606 through a screen as in FIG. 12.

The specification button 806-*a* indicates $\mu_{MIN}$, which is the minimum value of $\mu$ determined in advance, when at the left end of the display bar 806, and indicates $\mu_{MAX}$, which is the maximum value of $\mu$ determined in advance, when at the right end, and indicates an intermediate value when at the middle position. Like the specification button 806-*a*, the specification button 807-*a* corresponds to values from a minimum value $\lambda_{MIN}$ and a maximum value $\lambda_{MAX}$ of λ.

A user may freely set the mixing amounts of the speech signal and the background sound signal by moving the specification button 806-*a* and the specification button 807-*a* while watching a video. A desired acoustic signal may thereby be enjoyed according to the scene or content of a video.

As described above, the signal processing device 200 of the second embodiment calculates a weighted sum of the speech signal and a signal of the weighted sum of the difference signal and the second background sound signal calculated according to the weight according to the similarity of the feature data of the difference signal and the feature data of the second background sound signal. Accordingly, a signal in which the background sound and the speech are mixed at a predetermined ratio may be output with respect to various input signals.

As described above, according to the first and second embodiments, not only in the case of a stereo signal, but also in the case of a monaural signal or the like in which there is an equal background sound signal in acoustic signals, a background sound signal which is obtained by removing a speech signal from acoustic signals may be appropriately generated.

Third Embodiment

Figure 13:
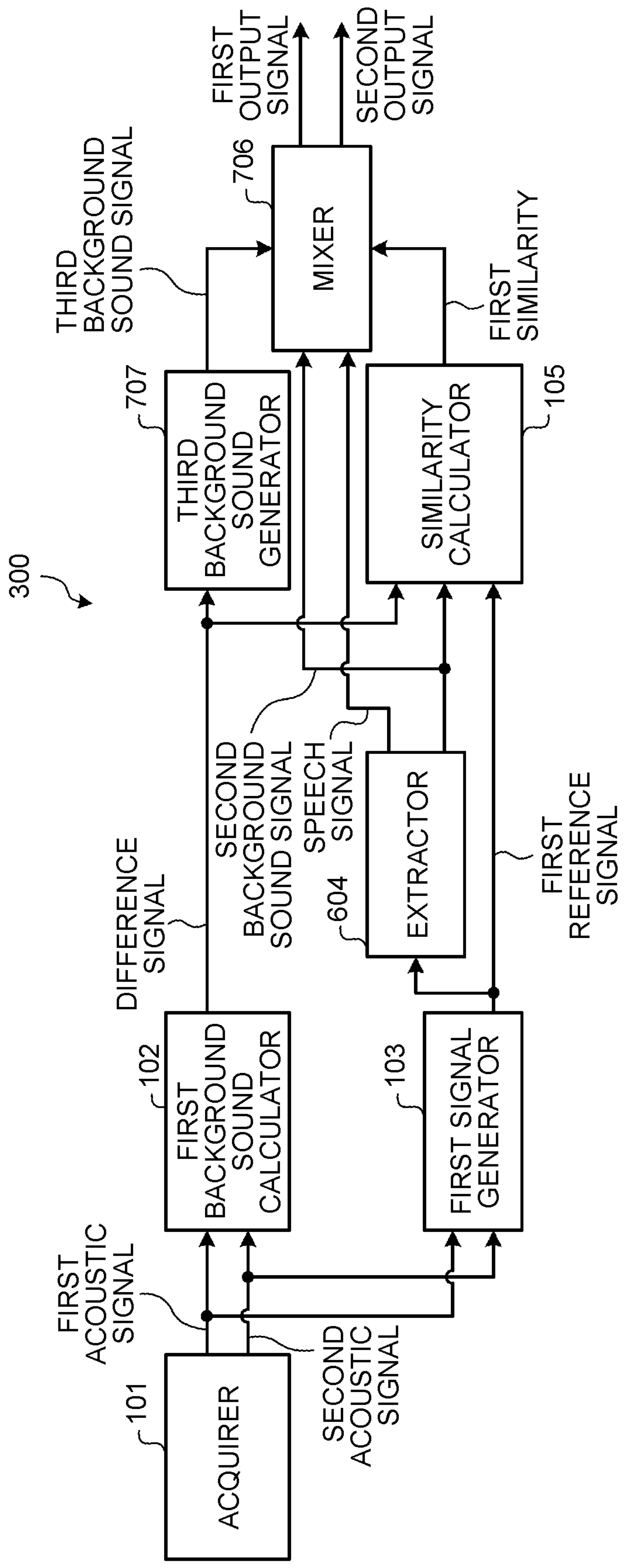
FIG. 13 is block diagram of a signal processing device of a third embodiment.

FIG. 13 is a block diagram illustrating an example configuration of a signal processing device 300 of a third embodiment. The signal processing device 300 of the third embodiment includes an acquirer 101, a first background sound calculator 102, a first signal generator 103, an extractor 604, a similarity calculator 105, a mixer 706, and a third background sound generator 707.

The third embodiment differs from the second embodiment in the function of the mixer 706 and in that the third background sound generator 707 is additionally provided. Other configurations and functions are the same as those in FIG. 10, the block diagram of the signal processing device 200 according to the second embodiment, and are thus denoted with the same reference numerals, and redundant description thereof will be omitted.

Many contents are created such that speech signals are equally included in left signals and right signals. However, in a case where speakers speak from the left and from the right such as a homemade video taken by an amateur or recording using a stereo microphone, speech signals may be included in difference signals. Thus, the third background sound generator 707 removes a speech signal included in a difference signal.

The third background sound generator 707 generates a third background sound signal by further removing the speech signal from a first sound signal (such as a different signal). The generation of a third background sound signal can be performed similarly to extraction of a second background sound signal from a first reference signal by the extractor 104, for example.

Figure 14:
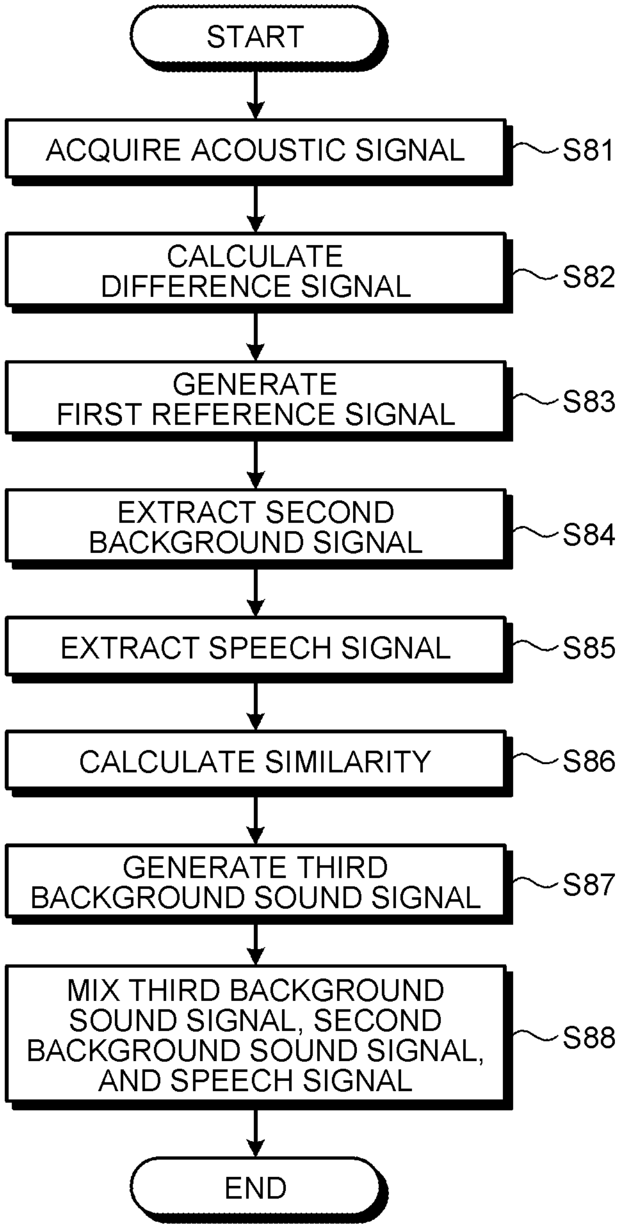
FIG. 14 is a flow chart illustrating an operation of the signal processing device of the third embodiment.

Next, an operation of the signal processing device 300 of the third embodiment will be described with reference to FIGS. 13 and 14. FIG. 14 is a flow chart illustrating an example operation of the signal processing device 300 of the third embodiment.

FIG. 14 is different from FIG. 11 illustrating an example operation of the signal processing device 200 of the second embodiment in that step S87 is added and also with respect to the process of step S88. Steps S81 to S86 are the same as steps S71 to S76 of FIG. 11, respectively, and redundant description thereof will be omitted.

In step S87, the third background sound generator 707 generates the third background sound signal from the first background sound signal (step S87).

In step S88, the mixer 706 calculates a weighted sum of the third background sound signal, the second background sound signal and the speech signal, and generates the first output signal and the second output signal (step S88).

First, the mixer 706 calculates a factor α for determining the ratio of weights of the third background signal and the second background sound signal based on the first similarity by the method described in step S16. Next, the mixer 706 acquires a factor λ for determining the amplitude of the background sound signal, and a factor μ for determining the amplitude of the speech signal.

The mixer 706 calculates the first output signal and the second output signal by the following Equations (21) and (22) by using the third background sound signal. Here, the third background sound signal is given as B'.

$$L_{OUT}=\lambda(\alpha B'+(1-\alpha)B)+\mu V \tag{21}$$

$$R_{OUT}=\lambda(\alpha B'+(1-\alpha)B)+\mu V \tag{22}$$

As described above, the signal processing device 300 of the third embodiment uses the third background sound signal by further removing the speech signal from the difference signal, which allows speech to be removed in more contents.

Fourth Embodiment

Figure 15:
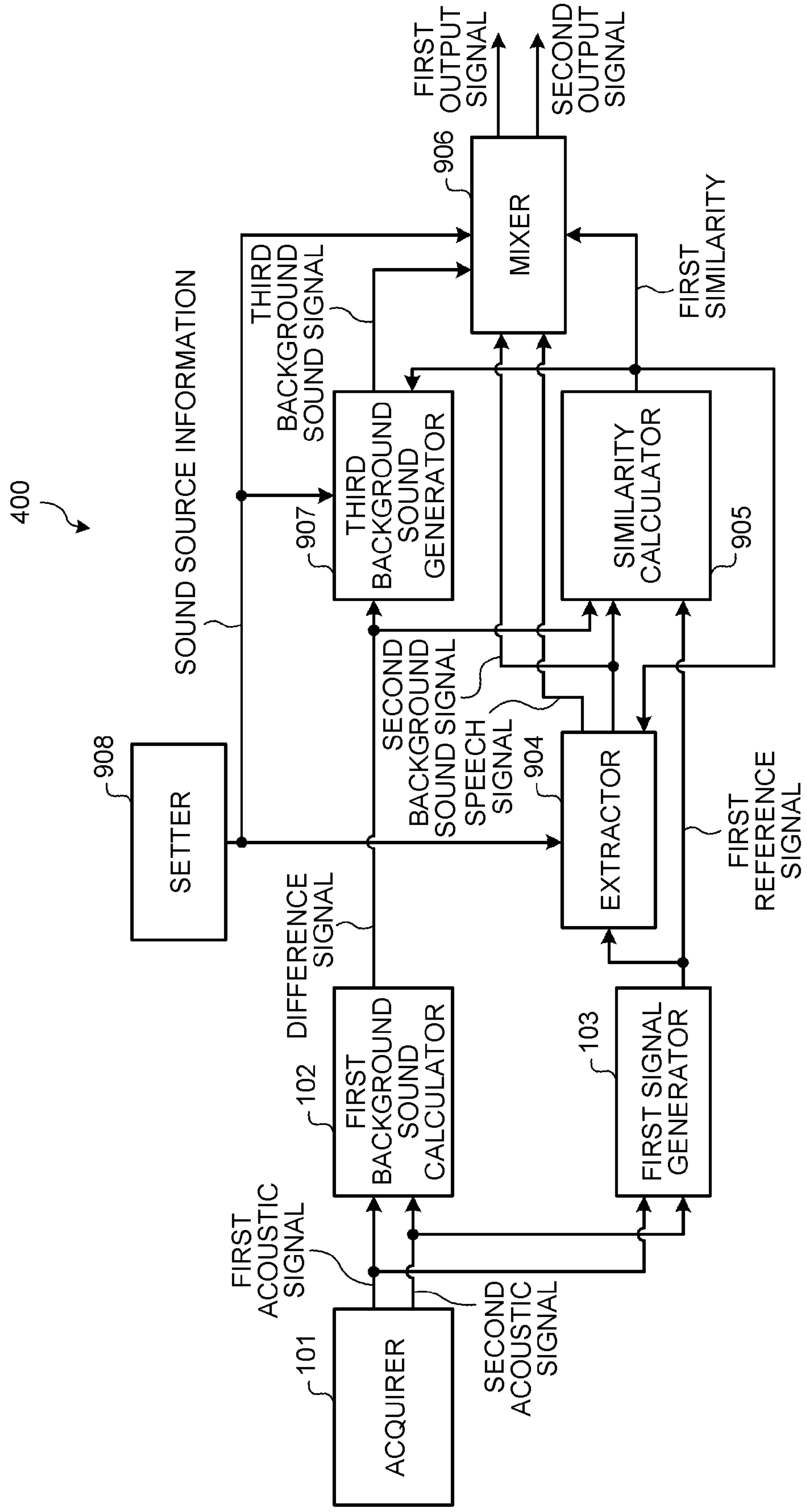
FIG. 15 is a block diagram of a signal processing of a fourth embodiment.

FIG. 15 is a block diagram illustrating an example configuration of a signal processing device 400 of a fourth embodiment. The signal processing device 400 of the fourth embodiment includes an acquirer 101, a first background sound calculator 102, a first signal generator 103, an extractor 904, a similarity calculator 905, a mixer 906, a third background sound generator 907, and a setter 908.

The fourth embodiment differs from the third embodiment in the functions of the extractor 904, the similarity calculator 905, the mixer 906, and the third background sound generator 907 and in that the setter 908 is additionally provided. Other configurations and functions are the same as those in FIG. 13, the block diagram of the signal processing device 300 according to the third embodiment, and are thus denoted with the same reference numerals, and redundant description thereof will be omitted.

The third embodiment in which the third background sound generator 707 is additionally provided effective when importance is placed on the background sound signal in generating the output signal, but cannot be utilized and increases the cost when importance is placed on the speed signal. Thus, in the fourth embodiment, whether or not to simplify the processing of the extractor 904 and whether or not to simplify the processing of the third background sound generator 907 are controlled depending on a sound source on which importance is placed in generating an output signal to reduce the calculation cost while maintaining the quality of the output signal.

FIG. 16 is a table illustrating relationships of weights of the third background sound signal, the second background sound signal, and the speech signal at the mixer 906. “LARGE” and “SMALL” represent relative magnitudes of the weights on the signals (the third background sound signal, the second background sound signal, and the speech signal), for example. In the example of Equations (21) and (22) described above, $\lambda\times\alpha$, $\lambda\times(1-\alpha)$, and $\mu$ correspond to the weights on the third background sound signal, the second background sound signal, and the speech signal, respectively. For example, under Condition 1 (importance is placed on the background sound signal in the output and the first similarity is high), the mixer 906 calculates a weighted sum of the signals with a larger weight on the third background sound signal than those on the second background sound signal and the speech signal.

Whether or not to simplify the processing of the extractor 904 and the third background sound generator 907 may be controlled according to the conditions of FIG. 16. For example, the extractor 904 relating to extraction of the second background sound signal and the speech signal simplifies the processing only when importance is placed on the background sound signal in the output and when the first similarity is high (Condition 1 in the example of FIG. 16). The third background sound generator 907 relating to generation of the third background sound signal simplifies the processing only when importance is placed on the speech signal in the output or when the first similarity is low (Conditions 2 to 4 in the example of FIG. 16).

Referring back to FIG. 15, the setter 908 sets sound source information (output sound source). The sound source information is information indicating whether to place importance on an output of a background sound signal or an output of a speech signal, for example. In the following, an example of setting the sound source information by using the factors $\lambda$ and $\mu$ will be described. First, the setter 908 sets whether or not the sound source to be output is a background sound signal based on the factor $\lambda$ for determining the amplitude of the background sound signal and the factor $\mu$ for determining the amplitude of the speech signal determined for calculating the first output signal and the second output signal.

When the factor $\mu$ is set to 0 or when $\lambda-\mu$ is equal to or larger than a threshold $\lambda_{TH}$, the setter 908 determines that importance is placed on the background signal in the generation of the output signal and determines the output sound source to be the background sound signal. Here, the threshold $\lambda_{TH}$ can be set to any positive value such as half the maximum value $\lambda_{MAX}$. When the factor $\mu$ is not 0 and when $\lambda-\mu$ is smaller than the threshold $\lambda_{TH}$, the setter 908 determines the output source to be the speech signal. In addition, the setter 908 may set the output sound source information to be a one dimensional value expressing the distance to the background sound signal. In this case, the value of the sound source information is set to be proportional to $\lambda-\mu$ or $\lambda/\mu$ with a certain maximum value.

Figure 17:
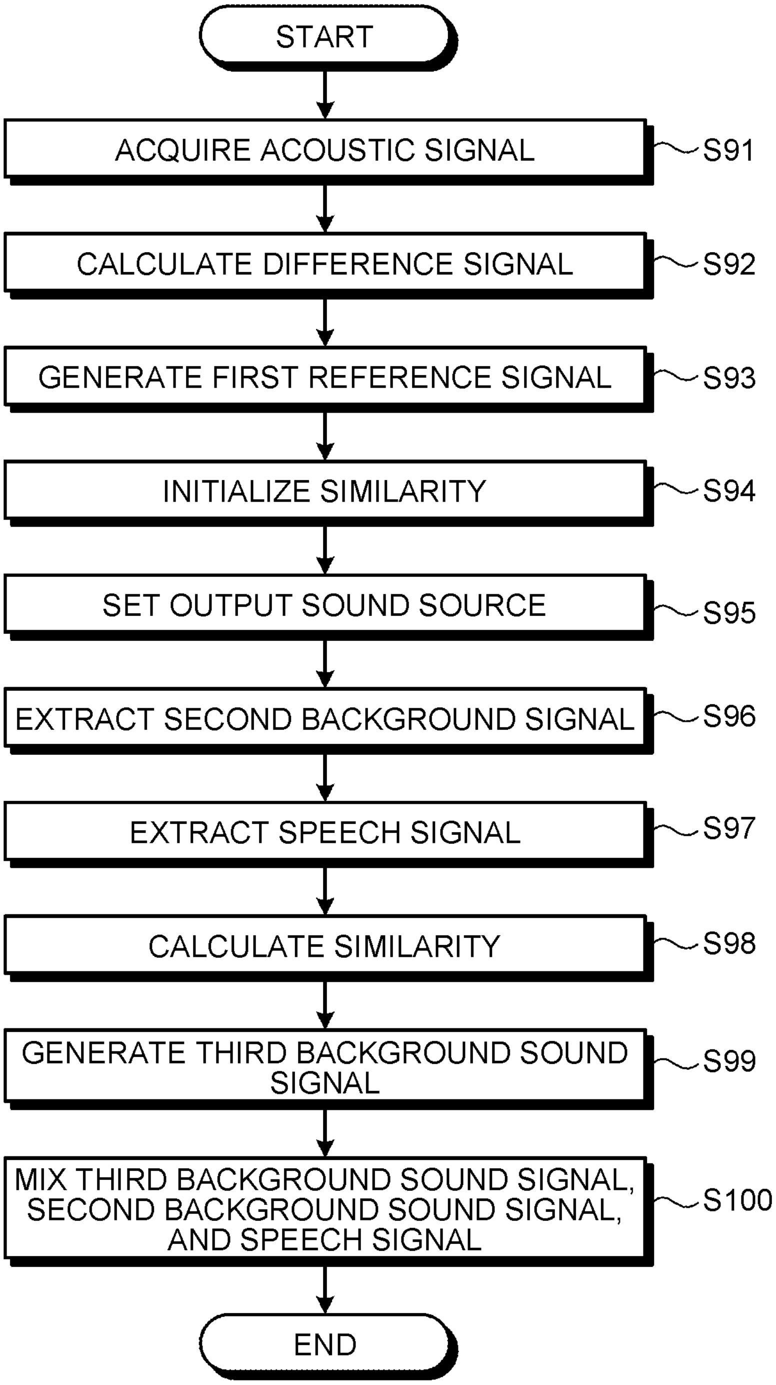
FIG. 17 is a flow chart illustrating an operation of the signal processing device according to the fourth embodiment.

Next, an operation of the signal processing device 400 of the fourth embodiment will be described with reference to FIGS. 15 and 17. FIG. 17 is a flow chart illustrating an example operation of the signal processing device 400 of the fourth embodiment.

FIG. 17 is different from FIG. 14 illustrating an example operation of the signal processing device 300 of the third embodiment in that steps S94 and S95 are added and also with respect to the processes of steps S96 to S100. Steps S91 to S93 are the same as steps S81 to S83 of FIG. 14, respectively, and redundant description thereof will be omitted.

In step S94, the similarity calculator 905 initializes the first similarity. The initial value may be set to 0, for example (step S94).

Next, in step S95, the setter 908 sets the output sound source by using the values of the factor $\lambda$ and the factor $\mu$ used for generation of the output signal (step S95).

In step S96, the extractor 904 extracts the second background sound signal from the first reference signal based on whether or not the output sound source is a background sound signal and the magnitude of the first similarity, or based on the value representing the distance to the background sound signal and the magnitude of the first similarity (step S96). For example, the extractor 904 simplifies the processing as the weighted linear sum of the magnitude of the first similarity and the distance to the background sound of the output sound source is larger. The extractor 904 simplifies the processing by reducing the number of times of repetition of Equation (3), for example. Alternatively, the extractor 904 may simplify the processing by using a band-pass filter that reduces the speech.

Note that extractor 904 controls whether or not to simplify the processing by using the first similarity (calculated similarity, etc.) calculated at time before the processing target time.

Next, in step S97, the extractor 904 extracts the speech signal from the first reference signal (step S97). The extractor 904 may extract the speech signal by the same method as that of the extractor 604.

In step S98, the similarity calculator 905 calculates the first similarity by using the feature data of the difference signal, the feature data of the second background sound signal, and the feature data of the first reference signal (step S98). The similarity calculator 905 may calculate the similarity by the same method as that of the similarity calculator 105. The extractor 904, the mixer 906, and the third background sound generator 907 refer to the latest similarity calculated by the similarity calculator 905 to perform the respective processes.

In step S99, the third background sound generator 907 generates the third background signal from the first background signal based on whether or not the output sound source is a background sound signal and the magnitude of the first similarity, or based on the value representing the distance to the background sound signal and the magnitude of the first similarity (step S99). For example, the third background sound generator 907 simplifies the processing as the weighted linear sum of the magnitude of the first similarity and the distance to the background sound of the output sound source is smaller. The third background sound generator 907 performs the same processing as the extraction of the second background sound signal, and simplifies the processing by reducing the number of times of repetition of Equation (3), for example. Alternatively, the third background sound generator 907 may simplify the processing by using a band-pass filter that reduces the speech. The third background sound generator 907 may also simplify the processing by outputting the difference signal as the third background sound signal without any change.

Lastly, in step S100, the mixer 906 calculates a weighted sum of the third background sound signal and the second background sound signal, and generates the first output signal and the second output signal (step S100). The mixer 906 calculates the first output signal and the second output signal by the Equations (21) and (22) by using the third background sound signal similarly to the mixer 706 by using the factor $\lambda$ for determining the amplitude of the background sound signal and the factor $\mu$ for determining the amplitude of the speech signal used by the setter 908.

As described above, the signal processing device 400 of the fourth embodiment gives priority to processing relating to generation or extraction of a signal with the largest weight of the third background sound signal, the second background sound signal and the speech signal relating to the output signal, which can reduce the calculation cost while maintaining the quality.

Figure 18:
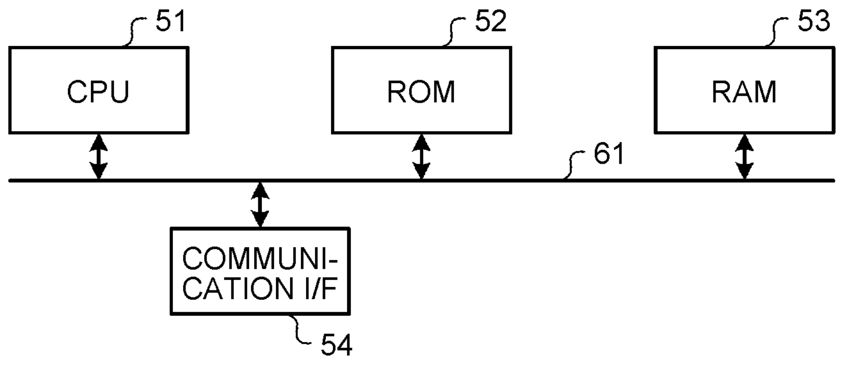
FIG. 18 is a hardware configuration diagram of the signal processing device according to the first to fourth embodiments.

Next, a hardware configuration of the signal processing device according to the first to fourth embodiments will be described with reference to FIG. 18. FIG. 18 is an explanatory diagram illustrating a hardware configuration of the signal processing device according to the first to fourth embodiments.

The signal processing device according to the first to fourth embodiments includes a control device such as a CPU (Central Processing Unit) 51, a storage device such as a ROM (Read Only Memory) 52 or a RAM (Random Access Memory) 53, a communication I/F 54 for connecting to a network and performing communication, and a bus 61 connecting each unit.

Programs to be executed by the signal processing device according to the first to fourth embodiments are provided being embedded in the ROM 52 or the like in advance.

The programs to be executed by the signal processing device according to the first to fourth embodiments may also be provided a computer program product by being recorded, as a file in an installable or executable format, in a computer-readable recording medium such as a CD-ROM (Compact Disk Read Only Memory), a flexible disk (FD), a CD-R (Compact Disk Recordable), a DVD (Digital Versatile Disk) or the like.

Furthermore, the programs to be executed by the signal processing device according to the first to fourth embodiments may be provided by being stored on a computer connected to a network such as the Internet, and being downloaded via the network. Also, the programs to be executed by the signal processing device according to the first to fourth embodiments may be provided or distributed via a network such as the Internet.

The programs to be executed by the signal processing device according to the first to fourth embodiments may cause a computer to function as each unit of the signal processing device described above. This computer may be realized by the CPU 51 reading the programs from a computer-readable recording medium onto a main memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal processing device comprising:

a microprocessor configured to operate as at least:

an acquirer configured to acquire a first acoustic signal and a second acoustic signal;

a first background sound calculator configured to calculate a first background sound signal in which a speech signal is removed, based on the first acoustic signal and the second acoustic signal;

a first signal generator configured to generate a first reference signal from at least one of the first acoustic signal and the second acoustic signal;

an extractor configured to extract a second background sound signal by removing a speech signal from the first reference signal;

a similarity calculator configured to calculate a first similarity indicating a degree of similarity between feature data of the first background sound signal and feature data of the second background sound signal; and a mixer configured to calculate a weighted sum of the first background sound signal and the second background sound signal in such a way that a greater weight is given to the first background sound signal as the first similarity is higher and a greater weight is given to the second background sound signal as the first similarity is lower.

2. The device according to claim 1, wherein the first background sound calculator is configured to calculate a first background sound signal that is a difference signal between the first acoustic signal and the second acoustic signal.

3. The device according to claim 1, wherein the first signal generator is configured to generate a first reference signal that is one of the first acoustic signal, the second acoustic signal, and a weighted sum of the first acoustic signal and the second acoustic signal.

4. The device according to claim 1, wherein the extractor is configured to further extract a speech signal from the first reference signal, and the mixer is configured to calculate a weighted sum of the first background sound signal, the second background sound signal, and the extracted speech signal.

5. The device according to claim 4, wherein the microprocessor is further configured to operate as a third background sound generator configured to generate a third background sound signal by further removing a speech signal from the first background sound signal, and the mixer is configured to calculate a weighted sum of the third background sound signal, the second background sound signal, and the extracted speech signal.

6. The device according to claim 5, wherein the microprocessor is further configured to operate as a setter configured to set sound source information indicating a sound source on which importance is placed in an output, the extractor is configured to extract a speech signal from the first reference signal according to the sound source information and the first similarity, the third background sound generator is configured to generate the third background sound signal according to the sound source information and the first similarity, and the mixer is configured to give a greater weight to the extracted speech signal when the sound source information indicates that importance is placed on speech, and give greater weights to the third background signal and the second background sound signal when the sound source information indicates that importance is placed on a background sound.

7. The device according to claim 6, wherein the extractor is configured to switch to simpler processing when the sound source information indicates that importance is placed on a background sound and when the first similarity is equal to or higher than a threshold.

8. The device according to claim 6, wherein the third background sound generator is configured to switch to simpler processing when the sound source information indicates that importance is placed on speech or when the first similarity is smaller than a threshold.

9. The device according to claim 6, wherein the third background sound generator is configured to generate the first background sound signal as the third background sound signal when the sound source information indicates that importance is placed on speech or when the first similarity is smaller than a threshold.

10. The device according to claim 1, wherein the similarity calculator is configured to further calculate a second similarity indicating a degree of similarity between the feature data of the first background sound signal and feature data of the first reference signal, and the microprocessor is further configured to operate as a corrector configured to correct the first similarity according to the second similarity.

11. The device according to claim 10, wherein the similarity calculator further includes a similarity acquirer configured to acquire an already calculated similarity that is the first similarity calculated at a first time, and the corrector is configured to make an amount of correction of the first similarity calculated at a second time later than the first time greater as the already calculated similarity is lower.

12. The device according to claim 1, wherein the similarity calculator includes a non-reliability calculator configured to calculate a non-reliability indicating a degree of likelihood of the first background sound signal being a noise, and a corrector configured to correct the first similarity according to the non-reliability.

13. The device according claim 1, wherein the similarity calculator includes a level calculator configured to calculate a first background sound signal level that is a amplitude of the first background sound signal within a unit time, and a second background sound signal level that is a amplitude of the second background sound signal within the unit time, and a similarity generator configured to make the first similarity higher as a ratio of the first background sound signal level to the second background sound signal level is greater.

14. The signal processing device according to claim 1, wherein the similarity calculator includes a second signal generator configured to generate a third reference signal that is a weighted sum of the first reference signal and the second background sound signal, and the similarity calculator is configured to calculate the first similarity according to a degree of similarity between the feature data of the first background sound signal and feature data of the third reference signal.

15. The device according to claim 14, wherein the similarity calculator further includes a similarity acquirer configured to acquire an already calculated similarity that is the first similarity calculated at a first time, and the second signal generator is configured to make a weight to be given to the second background sound signal greater as the already calculated similarity is higher.

16. The device according to claim 14, wherein the similarity calculator includes a level calculator configured to calculate a first background sound signal level that is a amplitude of the first background sound signal within a unit time, and a third reference signal level that is a amplitude of the third reference signal within the unit time, and a similarity generator configured to make the first similarity higher as a ratio of the first background sound signal to the third reference signal level is greater.

17. A signal processing method comprising:

acquiring a first acoustic signal and a second acoustic signal;

calculating a first background sound signal in which a speech signal is removed, based on the first acoustic signal and the second acoustic signal;

generating a first reference signal from at least one of the first acoustic signal and the second acoustic signal;

extracting a second background sound signal by removing a speech signal from the first reference signal;

calculating a first similarity indicating a degree of similarity between feature data of the first background sound signal and feature data of the second background sound signal; and calculating a weighted sum of the first background sound signal and the second background sound signal in such a way that a greater weight is given to the first background sound signal as the first similarity is higher and a greater weight is given to the second background sound signal as the first similarity is lower.

18. A computer program product comprising a non-transitory computer-readable medium containing a program executed by a computer, the program causing the computer to execute at least:

acquiring a first acoustic signal and a second acoustic signal;

calculating a first background sound signal in which a speech signal is removed, based on the first acoustic signal and the second acoustic signal;

generating a first reference signal from at least one of the first acoustic signal and the second acoustic signal;

extracting a second background sound signal by removing a speech signal, from the first reference signal;

calculating a first similarity indicating a degree of similarity between feature data of the first background sound signal and feature data of the second background sound signal; and calculating a weighted sum of the first background sound signal and the second background sound signal in such a way that a greater weight is given to the first background sound signal as the first similarity is higher and a greater weight is given to the second background sound signal as the first similarity is lower.

* * * * *